(12) United States Patent
Takamatsu et al.

(10) Patent No.: US 7,412,317 B2
(45) Date of Patent: Aug. 12, 2008

(54) VEHICLE INTEGRATED CONTROL SYSTEM

(75) Inventors: Hideki Takamatsu, Anjo (JP); Hiroshi Mizuno, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 497 days.

(21) Appl. No.: 10/998,740

(22) Filed: Nov. 30, 2004

(65) Prior Publication Data

US 2005/0143893 A1 Jun. 30, 2005

(30) Foreign Application Priority Data

Dec. 25, 2003 (JP) ............................ 2003-430683

(51) Int. Cl.
*G06F 7/70* (2006.01)
(52) U.S. Cl. .............................. 701/70; 701/91; 701/84
(58) Field of Classification Search .................. 701/70, 701/71, 72, 78, 84, 83, 91
See application file for complete search history.

(56) References Cited

U.S. PATENT DOCUMENTS

| 5,351,776 | A |   | 10/1994 | Keller et al. |   |
|---|---|---|---|---|---|
| 5,431,242 | A | * | 7/1995 | Iwata et al. ................. | 180/197 |
| 5,517,410 | A | * | 5/1996 | Nakagawa et al. ............ | 701/51 |
| 5,682,316 | A | * | 10/1997 | Hrovat et al. ................. | 701/84 |
| 5,863,277 | A |   | 1/1999 | Melbourne |   |
| 6,095,945 | A | * | 8/2000 | Graf ............................. | 477/97 |
| 6,151,546 | A | * | 11/2000 | Schmitt et al. ................ | 701/84 |
| 6,216,081 | B1 | * | 4/2001 | Tabata et al. .................. | 701/87 |
| 6,389,347 | B1 | * | 5/2002 | Nozaki ......................... | 701/54 |
| 6,553,297 | B2 |   | 4/2003 | Tashiro et al. |   |
| 2002/0016659 | A1 | * | 2/2002 | Tashiro et al. ................. | 701/48 |
| 2002/0103055 | A1 | * | 8/2002 | Tani et al. .................... | 477/115 |
| 2003/0079720 | A1 | * | 5/2003 | Mccauley et al. ........... | 123/350 |
| 2003/0205930 | A1 |   | 11/2003 | Smart |   |
| 2004/0124703 | A1 | * | 7/2004 | Tani et al. .................. | 307/10.1 |

FOREIGN PATENT DOCUMENTS

| JP | A-62-184937 | 8/1987 |
|---|---|---|
| JP | A-05-085228 | 4/1993 |
| JP | A-2002-89314 | 3/2002 |
| JP | A-2003-191774 | 7/2003 |

OTHER PUBLICATIONS

U.S. Appl. No. 10/999,933, filed Dec. 1, 2004, Hideki Takamatsu et al.
U.S. Appl. No. 11/009,467, filed Dec. 13, 2004, Tsuneo Miyakoshi et al.

* cited by examiner

*Primary Examiner*—Mark Hellner
(74) *Attorney, Agent, or Firm*—Oliff & Berridge, PLC

(57) ABSTRACT

A vehicle integrated control system includes an external disturbance load compensator. The external disturbance load compensator executes a program including: a step of sensing a vehicle state; a step of sensing environmental information on the surroundings of the vehicle; a step of performing an external disturbance load calculation; a step of determining whether or not to permit an external disturbance load change based on the environmental information; when it is expected that the vehicle is about to move based on the environmental information, a step of suspending an external disturbance load change; when it is expected that the state of the vehicle does not change based on the environmental information, a step of calculating distribution ratio of a braking force to the main control system (brake) so as to cancel an engine torque change by the external disturbance load change.

21 Claims, 8 Drawing Sheets

VEHICLE INTEGRATED CONTROL SYSTEM

This nonprovisional application is based on Japanese Patent Application No. 2003-430683 filed with the Japan Patent Office on Dec. 25, 2003, the entire contents of which are hereby incorporated by reference.

BACKGROUND OF THE INVENTION

1. Field of the Invention

The present invention relates to a system controlling a plurality of actuators incorporated in a vehicle, and more particularly, a system controlling in an integrated manner a plurality of actuators with the possibility of mutual interference.

2. Description of the Background Art

There has been an increasing trend in recent years towards incorporating many types of motion control devices in the same vehicle to control the motion of the vehicle. The effect produced by each of the different types of motion control devices may not always emerge in a manner independent of each other at the vehicle. There is a possibility of mutual interference. It is therefore important to sufficiently organize the interaction and coordination between respective motion control devices in developing a vehicle that incorporates a plurality of types of motion control devices.

For example, when it is required to incorporate a plurality of types of motion control devices in one vehicle in the development stage of a vehicle, it is possible to develop respective motion control devices independently of each other, and then implement the interaction and coordination between respective motion control devices in a supplemental or additional manner.

In the case of developing a plurality of types of motion control devices in the aforesaid manner, organization of the interaction and coordination between respective motion control devices requires much time and effort.

With regards to the scheme of incorporating a plurality of types of motion control devices in a vehicle, there is known the scheme of sharing the same actuator among the motion control devices. This scheme involves the problem of how the contention among the plurality of motion control devices, when required to operate the same actuator at the same time, is to be resolved.

In the above-described case where the interaction and coordination among a plurality of motion control devices are to be organized in a supplemental or additional manner after the motion control devices are developed independently of each other, it is difficult to solve the problem set forth above proficiently. In practice, the problem may be accommodated only by selecting an appropriate one of the plurality of motion control devices with precedence over the others, and dedicate the actuator to the selected motion control device alone.

An approach related to the problem set forth above in a vehicle incorporating a plurality of actuators to drive a vehicle in the desired behavior is disclosed in the following publications.

Japanese Patent Laying-Open No. 5-85228 (Document 1) discloses an electronic control system of a vehicle that can reduce the time required for development, and that can improve the reliability, usability, and maintenance feasibility of the vehicle. This electronic control system for a vehicle includes elements coacting for carrying out control tasks with reference to engine power, drive power and braking operation, and elements for coordinating the coaction of the elements to effect a control of operating performance of the motor vehicle in correspondence to a request of the driver. Respective elements are arranged in the form of a plurality of hierarchical levels. At least one of the coordinating elements of the hierarchical level is adapted for acting on the element of the next hierarchical level when translating the request of the driver into a corresponding operating performance of the motor vehicle thereby acting on a pre-given subordinate system of the driver-vehicle system while providing the performance required from the hierarchical level for this subordinate system.

By organizing the entire system in a hierarchy configuration in accordance with this electronic control system for a vehicle, an instruction can be conveyed only in the direction from an upper level to a lower level. The instruction to execute the driver's request is transmitted in this direction. Accordingly, a comprehensible structure of elements independent of each other is achieved. The linkage of individual systems can be reduced to a considerable level. The independency of respective elements allows the individual elements to be developed concurrently at the same time. Therefore, each element can be developed in accordance with a predetermined object. Only a few interfaces with respect to the higher hierarchical level and a small number of interfaces for the lower hierarchical level have to be taken into account. Accordingly, optimization of the totality of the driver and the vehicle electronic control system with respect to energy consumption, environmental compatibility, safety and comfort can be achieved. As a result, a vehicle electronic control system can be provided, allowing reduction in the development time, and improvement in reliability, usability, and maintenance feasibility of a vehicle.

Japanese Patent Laying-Open No. 2003-191774 (Document 2) discloses a integrated type vehicle motion control device adapting in a hierarchy manner a software configuration for a device that controls a plurality of actuators in an integrated manner to execute motion control of a plurality of different types in a vehicle, whereby the hierarchy structure is optimized from the standpoint of practical usage. This integrated vehicle motion control device controls a plurality of actuators in an integrated manner through a computer based on information related to driving a vehicle by a driver to execute a plurality of types of vehicle motion control for the vehicle. At least the software configuration among the hardware configuration and software configuration includes a plurality of elements organized in hierarchy in a direction from the driver towards the plurality of actuators. The plurality of elements include: (a) a control unit determining the target vehicle state quantity based on the driving-related information at the higher level; and (b) an execution unit receiving the determined target vehicle state quantity as an instruction from the control unit to execute the received instruction via at least one of the plurality of actuators at the lower level. The control unit includes an upper level control unit and a lower level control unit, each issuing an instruction to control the plurality of actuators in an integrated manner. The upper level control unit determines a first target vehicle state quantity based on the driving-related information without taking into account the dynamic behavior of the vehicle, and supplies the determined first target vehicle state quantity to the lower level control unit. The lower level control unit determines the second target vehicle state quantity based on the first target vehicle state quantity received from the upper level control unit, taking into account the dynamic behavior of the vehicle, and supplies the determined second target vehicle state quantity to the execution unit. Each of the upper level control unit, the lower level control unit, and the execution unit causes the computer to execute a plurality of modules independent of each other on the software configuration to realize unique functions thereof In accordance with this integrated type vehicle motion control device, at least the software configuration among the hardware configuration and software configuration is organized in a hierarchy structure so as to include: (a) a control unit determining a target vehicle state quantity based on driving-related information at the higher level in the direction from the driver to the plurality of actuators; and (b) an execution unit receiving the determined target vehicle state quantity as an instruction from the control unit to execute the received instruction via at least one of the plurality of actuators at the lower level. In other words, at least the software configuration is organized in hierarchal levels such that the control unit and the execution unit are separated from each other in this vehicle motion control device. Since the control unit and the execution unit are independent of each other from the software configuration perspective, respective stages of development, designing, design modification, debugging and the like can be effected without influencing the other. Respective stages can be carried out concurrently with each other. As a result, the period of the working stage required for the entire software configuration can be readily shortened by the integrated vehicle motion control device.

However, the control devices disclosed in Documents 1 and 2 do not specifically disclose coordination control between driving and braking in vehicle movement control.

In the conventional driving force control, for example an air-conditioner compressor driving torque, an alternator driving torque or the like, which is a load relative to the torque produced from the engine that is a motive power source, is produced at random (in other words, irrespective of the intention of a driver). In this case, control is executed relative to the engine that is a driving power source so as to increase the engine torque corresponding to a required driving force from an engine auxiliary machine such as the air conditioner compressor or the alternator. The increase in the engine torque is used for the driving torque to the auxiliary machine, and also transmitted to the power train system, whereby the driving torque increases. Here, the driver may conventionally perform a brake manipulation to suppress an increase in the vehicle speed caused by the increase in the driving torque. Such a manipulation is awkward for the driver, and additionally, it means that the driver must perform a redundant manipulation.

SUMMARY OF THE INVENTION

The present invention has been made to solve the problem described above, and an object thereof is to provide a vehicle integrated control system that can eliminate the need for a redundant manipulation by a driver even when an external disturbance by an auxiliary machine of the vehicle occurs.

A vehicle integrated control system according to the present invention includes: a driving system control unit controlling a driving system of a vehicle based on a manipulation request related to driving of the vehicle; a brake system control unit controlling a brake system of the vehicle based on a manipulation request related to braking of the vehicle; and a driving force change suppression unit sensing a load change in a load device connected to a motive power source of the vehicle to control in an integrated manner the driving system control unit and the brake system control unit so as to suppress an effect of the load change.

According to the present invention, for example when a load change in a load device connected to a motive power source of a vehicle occurs (for example, when an operation of a compressor of an air conditioner driven by an engine is initiated), by the driving force change suppression unit, the driving system control unit and the brake system control unit are controlled in an integrated manner so as to suppress an effect of the load change. Here, "controlled in an integrated manner" means that, respective work production amounts (dividing amounts) of a driving device controlled by the driving system control unit and a brake device controlled by the brake system control unit are set in accordance with a driving force change occurring with the load change of the load device so as to suppress a change. As a result, a vehicle integrated control system that can eliminate the need for a redundant manipulation by a driver even when an external disturbance by an auxiliary machine of the vehicle occurs can be provided.

A vehicle integrated control system according to another aspect of the present invention includes: a driving system control unit controlling a driving system of a vehicle based on a manipulation request related to driving of the vehicle; a brake system control unit controlling a brake system of the vehicle based on a manipulation request related to braking of the vehicle; and a driving force change suppression unit controlling the vehicle so as to suppress a change in a driving force of a driving power source due to a load change in a load device having the driving power source for allowing the vehicle to run as a motive power source thereof The driving force change suppression unit includes a sensor sensing environmental information on surroundings of the vehicle; a controller controlling in an integrated manner a driving force of the driving system control unit and a braking force of the brake system control unit so as to suppress the change in the driving force; and a determiner determining whether or not control by the controller is to be executed based on the environmental information.

According to the present invention, for example, the driving system control unit senses an accelerator pedal manipulation that is a request of a driver, which is an exemplary operation request, to generate a control target of the driving system corresponding to the accelerator pedal manipulation using a driving basic driver model, whereby a power train that is an actuator is controlled. The brake system control unit senses a brake pedal manipulation that is a request of the driver, which is an exemplary operation request, to generate a control target of the brake system corresponding to the brake pedal manipulation using a brake basic driver model, whereby a brake device that is an actuator is controlled. It should be noted that the operation request is not restricted to be based upon the manipulation of the driver, and it may be automatically generated by a computer. The vehicle integrated control system includes the driving force change suppression unit that operates parallel to, or incorporated by, those two units of the driving system control unit and brake system control unit that operate autonomously. The driving force change suppression unit controls in an integrated manner a driving force of the driving system control unit and a braking force of the brake system control unit to suppress (for example, not to cause the driver to recognize) a change in the driving force even when revolutions of the engine that is a driving power source increases due to a change in the load of an auxiliary machine of the vehicle (an engine auxiliary machine), of which motive power source is the engine that is the driving power source of the vehicle. Here, the driving force change suppression unit generates information to be used at the driving system control unit and the brake system control unit, and provides the generated information to respective control units. Each control unit determines as to whether or not such input information, in addition to the driver's request from the driving force change suppression unit, is to be reflected in the motion control of the vehicle, and to what extent, if to be reflected. Each control unit also corrects the control target, and transmits the information among respective control units. Since each control unit operates autonomously, the power train (the engine, the transmission and the like) and brake device are controlled based on the eventual driving target and braking target calculated from the driver's manipulation information sensed by respective control unit, the information input from the driving force change suppression unit, and information transmitted among respective control units. Thus, the driving system control unit corresponding to a "running" operation that is the basic operation of the vehicle, and the brake system control unit corresponding to a "stop" operation are provided operable in a manner independent of each other. The driving force change suppression unit controlling the driving force of the driving system control unit and the braking force of the brake system control unit in an integrated manner is applied with respect to these control units in a parallel manner, or to be incorporated therein, so that the driver does not recognize the change in the driving force. The driving force change suppression unit determines whether or not control for not causing the driver to recognize the change in the driving force is to be executed, based on environmental information on surroundings of the vehicle. For example, there may be a case where the load of an engine auxiliary machine increases and the engine revolution increases from the idle revolution while the vehicle is stopped. In such a case, if the vehicle is to run soon thereafter, then the driver's accelerator pedal manipulation increases the engine revolution, and the change in the driving torque of the engine due to the load change in the engine auxiliary machine is absorbed. Accordingly, the load change in the engine auxiliary machine is once suspended until the vehicle starts to run. On the other hand, if the load of the engine auxiliary machine increases and the engine revolution increases when the vehicle continues to stop or when the vehicle is running with a running resistance that matches the rolling resistance of a down-climbing road, the driving torque increases as well. Therefore, in order to suppress (cancel) this, for example a required braking force of the brake system control unit is increased. Thus, the driver will not recognize the torque change of the engine, and hence it is not necessary for him/her to depress the brake pedal. Thus, a vehicle integrated control system that can eliminate the need for a redundant manipulation by a driver even when an external disturbance by an auxiliary machine of the vehicle occurs in the driving power source can be provided.

Preferably, the determiner determines that the control by the controller is not to be executed when a state of the vehicle changes based on the sensed environmental information.

According to the present invention, sensing as the environmental information that, for example, there is no traffic jam ahead of the vehicle when the vehicle is stopping at an intersection means that the vehicle will start to run as the traffic signal at that intersection changes. In other words, when it can be expected that the vehicle will start to move, i.e., the vehicle will transit to a driving state from the state of the current time point, a load change of the engine auxiliary machine is permitted after the vehicle transits to the driving state. Thus, it is expected that a driving state will be entered (in other words, the green light of the signal will be on and the driver will depress the accelerator pedal to move the vehicle). Here, the increase in the driving torque of the engine for starting the vehicle to move covers the load change of the engine auxiliary machine. In such a state, since the driver does not recognize the change in the driving force as a whole, the load change of the external disturbance load is suspended until the vehicle starts to move, and the control of the driving system control unit and the brake system control unit in an integrated manner is not conducted. Still, it is possible not to cause the driver to recognize that the driving force has changed.

More preferably, the driving force change suppression unit maintains the load unchanged until the state of the vehicle changes.

According to the present invention, for example when it can be expected that the vehicle will start to move, i.e., the vehicle will transit to a driving state from the state of the current time point, a load change of the engine auxiliary machine is maintained unchanged until the vehicle enters the driving state. As the driving state is entered, even when the load of the engine auxiliary machine is changed, the increase in the driving torque of the engine for starting the vehicle to move covers the load change of the engine auxiliary machine. Thus, it is possible not to cause the driver to recognize that the driving force has changed.

More preferably, the determiner determines that the control by the controller is not to be executed when the state of the vehicle changes from a stopped state to a running state based on the sensed environmental information.

According to the present invention, for example when the state of the vehicle changes from a stopped state to a running state, the load of the engine auxiliary machine is maintained unchanged until the vehicle transits to the running state. As the running state is entered, even when the load of the engine auxiliary machine is changed, the increase in the driving torque of the engine for starting the vehicle to move covers the load change of the engine auxiliary machine. Thus, it is possible not to cause the driver to recognize that the driving force has changed.

More preferably, the driving force change suppression unit maintains the load unchanged until the state of the vehicle changes from a stopped state to a running state.

According to the present invention, for example the load of the engine auxiliary machine is maintained unchanged until the state of the vehicle changes from a stopped state to a running state. As the running state is entered, even when the load of the engine auxiliary machine is changed, the increase in the driving torque of the engine for starting the vehicle to move covers the load change of the engine auxiliary machine. Thus, it is possible not to cause the driver to recognize that the driving force has changed.

More preferably, the determiner determines that the control by the controller is to be executed when a state of the vehicle does not change based on the sensed environmental information.

According to the present invention, for example when the state of the vehicle does not change (when a stopped state continues or when a running state at a constant speed on a gentle up-climbing road continues), the load change of the engine auxiliary machine is permitted at that time point. Since an increase in the engine torque associated with starting the vehicle may not cover an increase in the load of the engine auxiliary machine, the load change is immediately permitted, and the power train of the driving system and the brake of the brake system of the vehicle are controlled in an integrated manner to suppress (cancel) the torque increase of the engine that occurs due to the load change. Thus, the driver does not recognize that the driving force has changed and hence he/she does not perform redundant manipulations.

More preferably, the controller controls at least one of the driving system control unit and the brake system control unit so as to suppress (cancel) the change in the driving force.

According to the present invention, for example, at least one of the driving system control unit and the brake system control unit is controlled so that the driver does not recognize that the driving force has changed. Accordingly, the driver does not recognize that the driving force has changed and hence he/she does not perform redundant manipulations.

More preferably, the controller executes control so as to change a required braking force of the brake system control unit based on a driving force of the driving system control unit in order to suppress (cancel) a change in the driving force.

According to the present invention, for example a required braking force of the brake system control unit is changed based on an increase in the driving force of the driving system control unit in order to suppress (cancel) an increase in the driving toque of the engine due to an increase in the load of the engine auxiliary machine. Thus, the driver does not recognize that the driving force has changed and hence he/she does not perform redundant manipulations.

More preferably, the controller executes control so as to increase the required braking force of the brake system control unit.

According to the present invention, for example a required braking force of the brake system control unit is increased based on an increase in the driving force of the driving system control unit in order to suppress (cancel) an increase in the driving toque of the engine due to an increase in the load of the engine auxiliary machine. Thus, the driver does not recognize that the driving force has changed and hence he/she does not perform redundant manipulations.

More preferably, the load device is one of a power steering device, a compressor device of an air conditioner and an alternator device.

According to the present invention, for example, even when the load of the power steering device, the compressor device of an air conditioner, the alternator device or the like that is mounted on the vehicle and that is an engine auxiliary machine changes, the integrated control of the driving system control and the brake system control for suppressing (canceling) the change in the driving force is executed, or the load change is once suspended until the vehicle starts to move. Accordingly, it is possible not to cause the driver to recognize that the driving force has changed. As a result, the driver will not perform redundant manipulations.

More preferably, the controller may execute control such that a frictional engagement element of an automatic transmission controlled by the driving system control unit slips in order to suppress (cancel) a change in the driving force.

Thus, the frictional engagement element of an automatic transmission controlled by the driving system control unit is caused to slip in order to suppress (cancel) an increase in the driving torque of the engine due to an increase in the load of an engine auxiliary machine. Thus, the increase in the engine torque is hardly transmitted to the wheels. Accordingly, the driver does not recognize that the driving force has changed and hence he/she does not perform redundant manipulations.

More preferably, the controller may execute control so as to change the gear ratio of an automatic transmission controlled by the driving system control unit in order to suppress (cancel) a change in the driving force.

Thus, the gear ratio of an automatic transmission is set to the high speed side in order to suppress (cancel) an increase in the driving torque of the engine due to an increase in the load of an engine auxiliary machine. Thus, the increase in the engine torque is hardly transmitted to the wheels. Accordingly, the driver does not recognize that the driving force has changed and hence he/she does not perform redundant manipulations.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
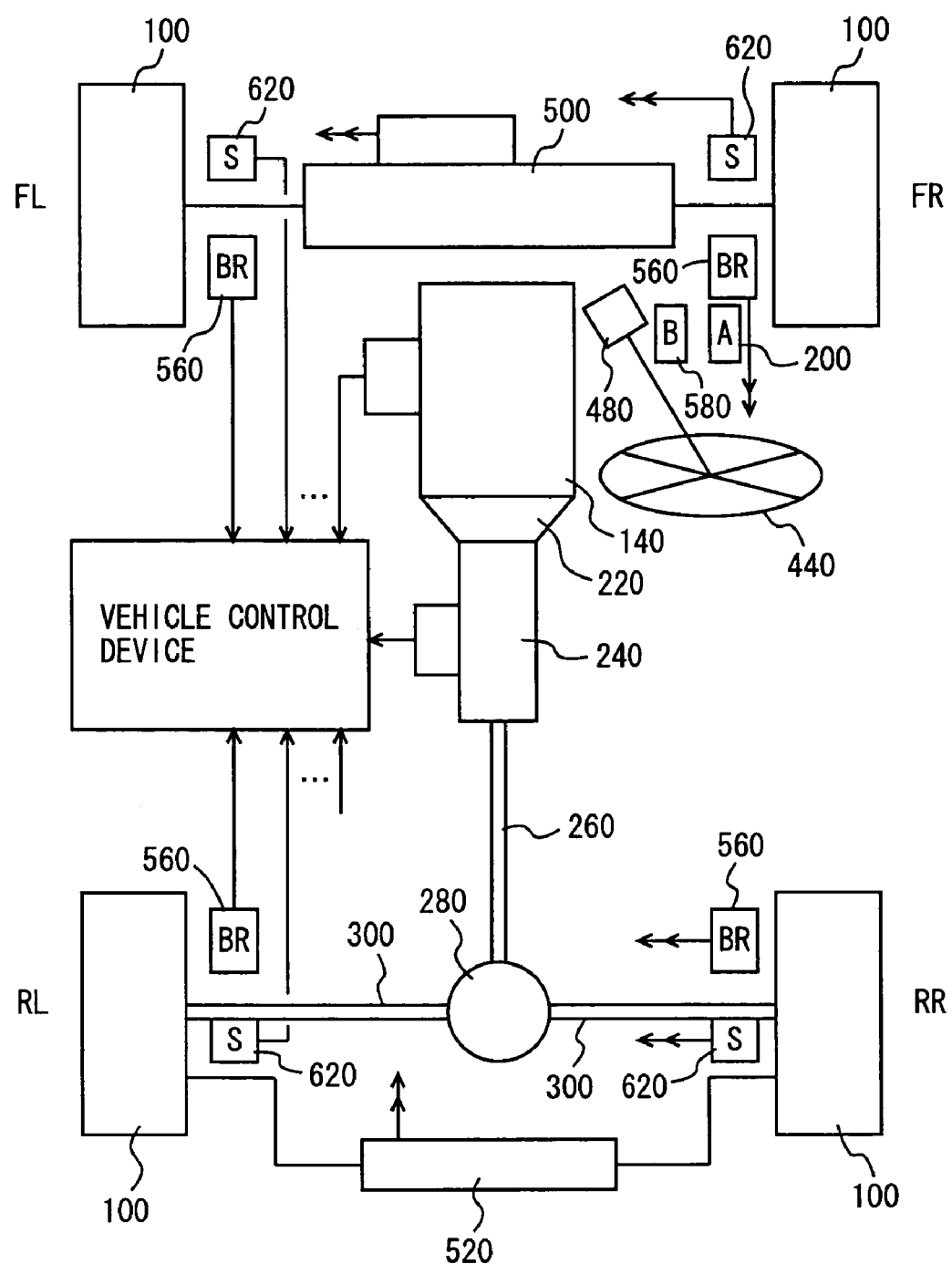
FIG. 1 is a block diagram of a vehicle in which the vehicle integrated control system of the present embodiment is incorporated.

An embodiment of the present invention will be described hereinafter with reference to the drawings. The same elements have the same reference characters allotted. Their label and function are also identical. Therefore, detailed description thereof will not be repeated.

Referring to the block diagram of FIG. 1, a vehicle integrated control system according to an embodiment of the present invention has an internal combustion engine incorporated in a vehicle as a driving power source. The driving power source is not restricted to an internal combustion engine, and may be an electric motor alone, or a combination of an engine and an electric motor. The motive power source of the electric motor may be a secondary battery or a cell.

The vehicle includes wheels 100 at the front and back of respective sides. In FIG. 1, "FL" denotes a front-left wheel, "FR" denotes a front-right wheel, "RL" denotes a left-rear wheel, and "RR" denotes a rear-right wheel.

The vehicle incorporates an engine 140 as a motive power source. The operating state of engine 140 is electrically controlled in accordance with the amount or level by which the accelerator pedal (which is one example of a member operated by the driver related to the vehicle drive) is manipulated by the driver. The operating state of engine 140 is controlled automatically, as necessary, irrespective of the manipulation of accelerator pedal 200 by the driver (hereinafter referred to as "driving operation" or "accelerating operation").

The electric control of engine 140 may be implemented by, for example, electrically controlling an opening angle (that is, a throttle opening) of a-throttle valve disposed in an intake manifold of engine 140, or by electrically controlling the amount of fuel injected into the combustion chamber of engine 140.

The vehicle of the present embodiment is a rear-wheel-drive vehicle in which the right and left front wheels are driven wheels, and the right and left rear wheels are driving wheels. Engine 140 is connected to each of the rear wheels via a torque converter 220, a transmission 240, a propeller shaft 260 and a differential gear unit 280 as well as a drive shaft 300 that rotates with each rear wheel, all arranged in the order of description. Torque converter 220, transmission 240, propeller shaft 260 and differential gear 280 are power transmitting elements that are common to the right and left rear wheels.

Transmission 240 includes an automatic transmission that is not shown. This automatic transmission electrically controls the gear ratio at which the revolution speed of engine 140 is changed to the speed of rotation of an output shaft of transmission 240.

The vehicle further includes a steering wheel 440 adapted to be turned by the driver. A steering reaction force applying device 480 electrically applies a steering reaction force corresponding to a turning manipulation by the driver (hereinafter, referred to as "steering") to steering wheel 440. The level of the steering reaction force is electrically controllable.

The direction of the right and left front wheels, i.e. the front-wheel steering angle is electrically altered by a front steering device 500. Front steering device 50 controls the front-wheel steering angle based on the angle, or steering wheel angle, by which steering wheel 440 is turned by the driver. The front-rear steering angle is controlled automatically, as necessary, irrespective of the turning operation. In other words, steering wheel 440 is mechanically insulated from the right and left front wheels.

The direction of the left and right wheels, i.e., the rear-wheel steering angle is electrically altered by a rear steering device 520, likewise the front-wheel steering angle.

Each wheel 100 is provided with a brake 560 that is actuated so as to restrict its rotation. Each brake 560 is electrically controlled in accordance with the operated amount of a brake pedal 580 (which is one example of a member operated by the driver related to vehicle braking), and also controlled individually for each wheel 100 automatically.

In the present vehicle, each wheel 100 is suspended to the vehicle body (not shown) via each suspension 620. The suspending characteristics of respective suspension 620 is electrically controllable individually.

The constituent elements of the vehicle set forth above include an actuator adapted to be operated so as to electrically actuate respective elements as follows:

(1) An actuator to electrically control engine 140;

(2) An actuator to electrically control transmission 240;

(3) An actuator to electrically control steering reaction force applying device 480;

(4) An actuator to electrically control front steering device 500;

(5) An actuator to electrically control rear steering device 520;

(6) A plurality of actuators provided in association with respective brakes 560 to electrically control the braking torque applied to each wheel by a corresponding brake 560 individually;

(7) A plurality of actuators provided in association with respective suspensions 620 to electrically control the suspending characteristics of a corresponding suspension 620 individually.

As shown in FIG. 1, the vehicle integrated control system is incorporated in a vehicle having the aforesaid plurality of actuators connected. The motion control device is actuated by the electric power supplied from a battery not shown (which is an example of the vehicle power supply).

Additionally, an accelerator pedal reaction force applying device may be provided for accelerator pedal 200. In this case, an actuator to electrically control such an accelerator pedal reaction force applying device is to be provided.

Figure 2:
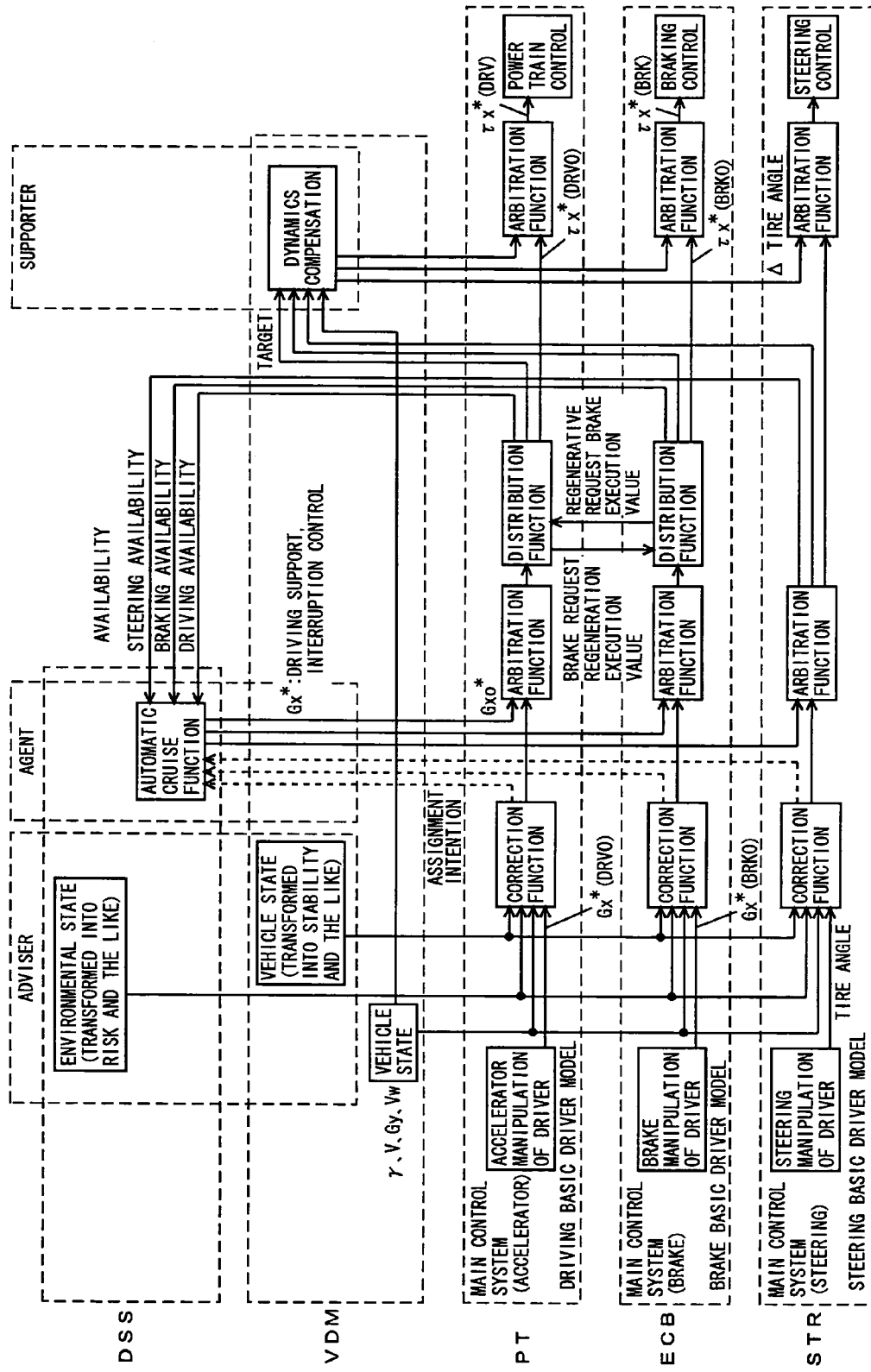
FIG. 2 is a schematic diagram of a configuration of the vehicle integrated control system according to the present embodiment.

FIG. 2 is a schematic diagram of a configuration of the vehicle integrated control system. The vehicle integrated control system is formed of three basic control units, i.e. a main control system (1) as the driving system control unit, a main control system (2) as the brake system control unit, and a main control system (3) as the steering system control unit.

At main control system (1) identified as the driving system control unit, a control target of the driving system corresponding to accelerator pedal manipulation is generated using the driving basic driver model, based on the accelerator pedal manipulation that is the sensed request of the driver, whereby the actuator is controlled. At main control system (1), the input signal from the sensor to sense the accelerator pedal operated level of the driver (stroke) is analyzed using the drive basic model to calculate a target longitudinal acceleration Gx* (DRV0). The target longitudinal acceleration Gx* (DRV0) is corrected by a correction functional block based on the information from an adviser unit. Further, target longitudinal acceleration Gx* (DRV0) is arbitrated by the arbitration functional block based on the information from an agent unit. Further, the driving torque and braking torque is distributed with main control system (2), and the target driving torque τx* (DRV0) of the driving side is calculated. Further, the target driving torque τx* (DRV0) is arbitrated by the arbitration functional block based on information from a supporter unit, and a target driving torque τx* (DRV) is calculated. The power train (140, 220, 240) is controlled so as to develop this target drive torque τx* (DRV).

At main control system (2) identified as the brake system control unit, a control target of the brake system corresponding to the brake pedal manipulation is generated using the brake basic driver model based on the brake pedal manipulation that is the sensed request of the driver, whereby the actuator is controlled.

At main control system (2), the input signal from a sensor to sense the brake pedal manipulated level (depression) of the driver is analyzed using a brake basic model to calculate a target longitudinal acceleration Gx* (BRK0). At main control system (2), the target longitudinal acceleration Gx* (BRK0) is corrected by a correction functional block based on the information from the adviser unit. Further at main control system (2), the target longitudinal acceleration Gx* (BRK0) is arbitrated by the arbitration functional block based on the information from the agent unit. Further at main control system (2), the driving torque and the braking torque are distributed with main control system (1), and the target braking torque τx* (BRK0) of the braking side is calculated. Further, the target braking torque τx* (BRK0) is arbitrated by the arbitration functional block based on the information from the support unit, and target braking torque τx* (BRK) is calculated. The actuator of brake 560 is controlled so as to develop this target braking torque τx* (BRK).

At main control system (3) identified as the steering system control unit, a control target of the steering system corresponding to the steering manipulation is generated using the steering brake basic driver model based on the steering manipulation that is the sensed request of the driver, whereby the actuator is controlled.

At main control system (3), an input signal from the sensor to sense the steering angle of the driver is analyzed using a steering basic model to calculate a target tire angle. The target tire angle is corrected by the correction functional block based on the information from the adviser unit. Further, the target tire angle is arbitrated by the arbitration functional block based on the information from the agent unit. Further, the target tire angle is arbitrated by the arbitration functional block based on the information from the supporter unit to calculate the target tire angle. The actuators of front steering device 500 and rear steering device 520 are controlled so as to develop the target tire angle.

Furthermore, the present vehicle integrated control system includes a plurality of processing units parallel to main control system (1) (driving system control unit), main control system (2) (brake system unit) and main control system (3) (steering system control unit), operating autonomously. The first processing unit is an adviser unit with an adviser function. The second processing unit is an agent unit with an agent function. The third processing unit is a support unit with a supporter function.

The adviser unit generates and provides to respective main control systems information to be used at respective main control systems based on the environmental information around the vehicle or information related to the driver. The agent unit generates and provides to respective main control systems information to be used at respective main control systems to cause the vehicle to realize a predetermined behavior. The supporter unit generates and provides to respective main control systems information to be used at respective main control systems based on the current dynamic state of the vehicle. At respective main control systems, determination is made as to whether or not such information input from the adviser unit, the agent unit and the supporter unit (information other than the request of the driver) is to be reflected in the motion control of the vehicle, and to what extent, if to be reflected. Furthermore, the control target is corrected, and/or information is transmitted among respective control units. Since each main control system operates autonomously, the actuator of the power train, the actuator of brake device and the actuator of steering device are controlled eventually at respective control units based on the eventual driving target, braking target and steering target calculated by the sensed manipulation information of the driver, information input from the adviser unit, agent unit and supporter unit, and information transmitted among respective main control systems.

Specifically, the adviser unit generates information representing the degree of risk with respect to the vehicle operation property based on the frictional resistance (μ value) of the road on which the vehicle is running, the outdoor temperature and the like as the environmental information around the vehicle, and/or generates information representing the degree of risk with respect to the manipulation of the driver based on the fatigue level of the driver upon shooting a picture of the driver. Information representing the degree of risk is output to each main control system. This information representing the degree of risk is processed at the adviser unit so the information can be used at any of the main control systems. At each main control system, the process is carried out as to whether or not to reflect the information related to the input risk for the vehicle motion control, in addition to the request of the driver from the processing unit, and to what extent the information is to be reflected, and the like.

Specifically, the agent unit generates information to implement an automatic cruise function for the automatic drive of vehicle. The information to implement the automatic cruise function is output to each main control system. At each main control system, the process is carried out as to whether or not to reflect the input information to implement the automatic cruise function, in addition to the request of the driver from the processing unit, and to what extent the information is to be reflected, and the like.

Further preferably, the supporter unit identifies the current dynamic state of the vehicle, and generates information to modify the target value at each main control system. The information to modify the target value is output to each main control system. At each main control system, the process is carried out as to whether or not to reflect the input information to modify the target value based on the dynamic state for the vehicle motion control, in addition to the request of the driver from the processing unit, and to what extent the information is to be reflected, and the like.

As shown in FIG. 2, the basic control units of main control system (1), main control system (2) and main control system (3), and the support unit of the adviser unit, agent unit, and supporter unit are all configured so as to operate autonomously. Main control system (1) is designated as the PT (Power Train) system. Main control system (2) is designated as the ECB (Electronic Controlled Brake) system. Main control system (3) is designated as the STR (Steering) system. A portion of the adviser unit and the portion of the agent unit are designated as the DSS (Driving Support System). A portion of the adviser unit, a portion of the agent unit, and a portion of the supporter unit are designated as the VDM (Vehicle Dynamics Management) system. Interruption control for intervention of control executed at main control system (1), main control system (2) and main control system (3) from the agent unit (automatic cruise function) is conducted in the control shown in FIG. 2.

Main control system (1) (driving system control unit) will be described in further detail with reference to FIG. 3. Although the designation of the variable labels may differ in FIG. 3 and et seq., there is no essential difference thereby in the present invention. For example, the interface is designated as Gx* (acceleration) in FIG. 2 whereas the interface is designated as Fx (driving force) in FIG. 3 and et seq. This corresponds to F (force)=m (mass)×α (acceleration), where the vehicle mass (m) is not the subject of control, and is not envisaged of being variable. Therefore, there is no essential difference between Gx* (acceleration) of FIG. 2 and Fx (driving force) of FIG. 3 and et seq.

Main control system (1) that is the unit to control the driving system receives information such as the vehicle velocity, gear ratio of the transmission and the like identified as shared information (9). Using such information and the driving basic driver model, Fxp0 representing the target longitudinal direction acceleration is calculated as the output of the driving basic driver model. The calculated Fxp0 is corrected to Fxp1 by a correction functional unit (2) using environmental state (6) that is the risk degree information (index) as an abstraction of risk and the like, input from the adviser unit. Information representing the intention of assignment with respect to realizing an automatic cruise function is output from correction functional unit (2) to agent unit (7). Using Fxp1 corrected by correction functional unit (2) and information for implementation of automatic cruise functional unit (7), input from the agent unit, the information (Fxp1, Fxa) is arbitrated by arbitration functional unit (3) to Fxp2.

The distribution ratio of the driving torque and braking torque is calculated between main control system (1) that is the unit controlling the driving system and main control system (2) that is the unit driving the brake system. At main control system (1) corresponding to the driving unit side, Fxp3 of the driving system is calculated. FxB is output from distribution functional unit (4) to main control system (2), and the driving availability and target value are output to agent unit (7) and dynamic (8) that is the supporter unit, respectively.

At arbitration functional unit (5), the information is arbitrated to Fxp4 using Fxp3 output from distribution functional unit (4) and Fxp_vdm from dynamics compensation functional unit (8). Based on the arbitrated Fxp4, the power train is controlled.

Figure 3:
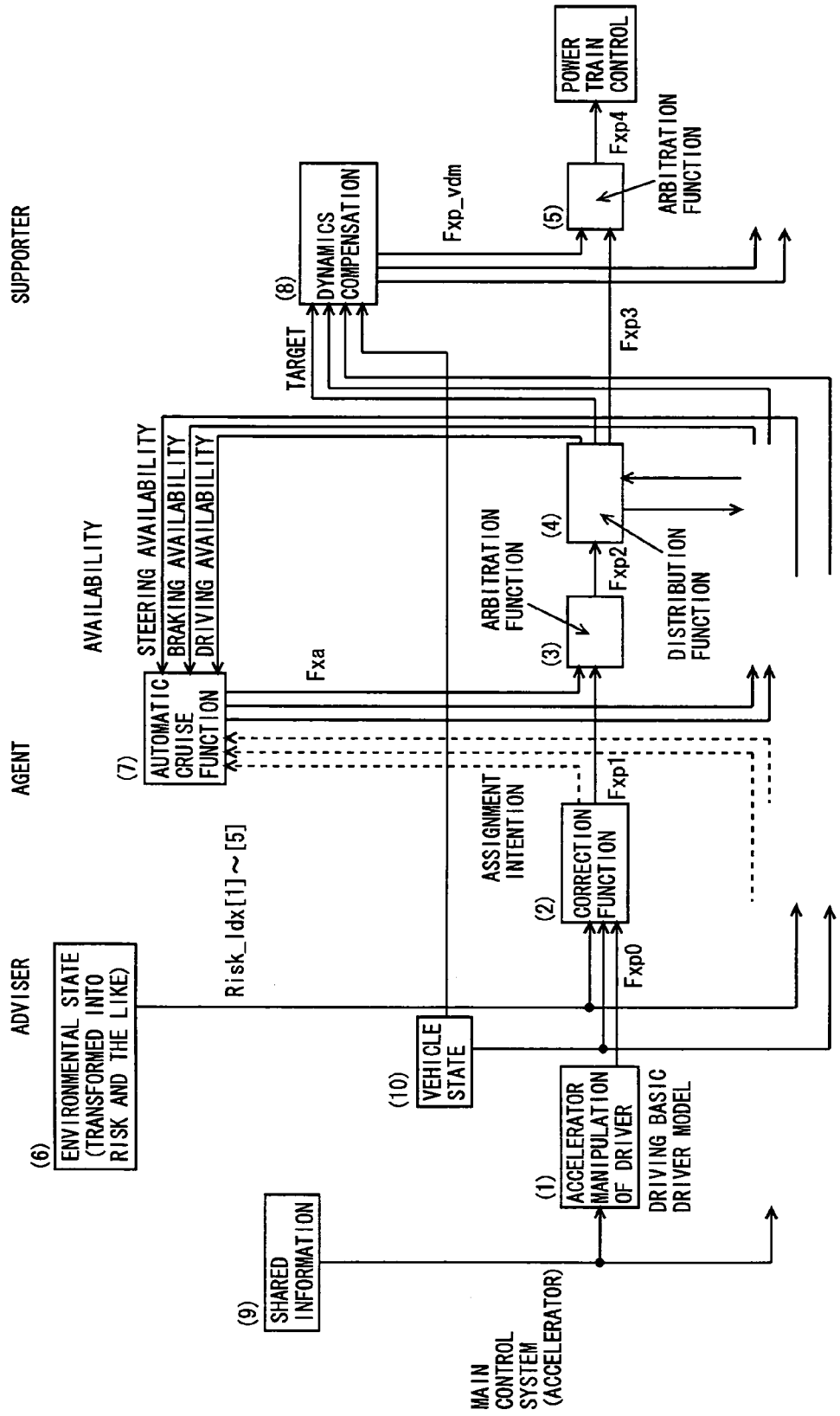
FIG. 3 is a schematic diagram of a configuration of a main control system (1).

The elements shown in FIG. 3 are also present in main control system (2) and main control system (3). Since main control system (2) and main control system (3) will be described in further detail with reference to FIGS. 5-6, description on main control system (2) and main control system (3) based on drawings corresponding to main control system (1) of FIG. 3 will not be repeated.

Figure 4:
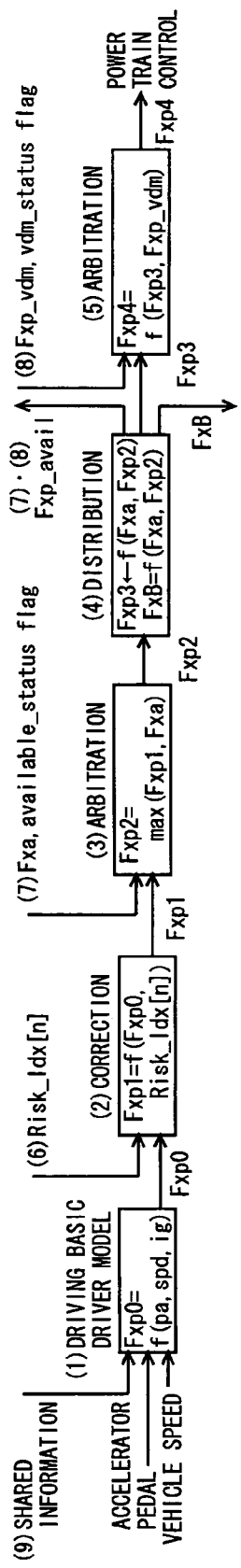
FIG. 4 is a diagram representing the input and output of signals in a main control system (1).
Figure 5:
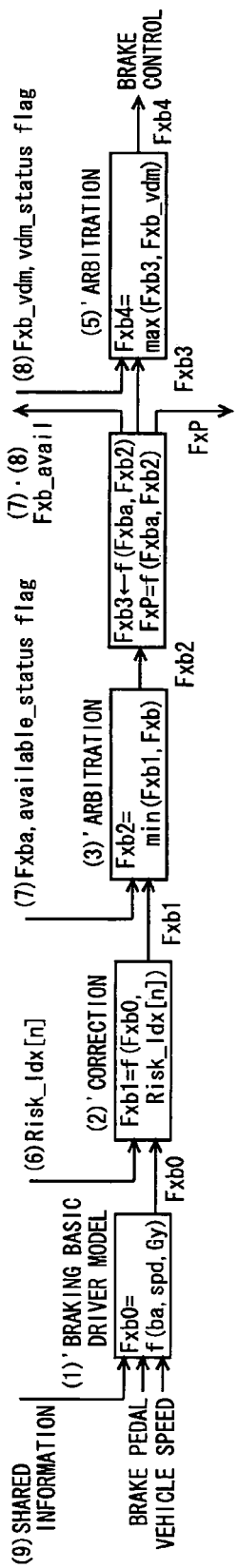
FIG. 5 is a diagram representing the input and output of signals in a main control system (2).
Figure 6:
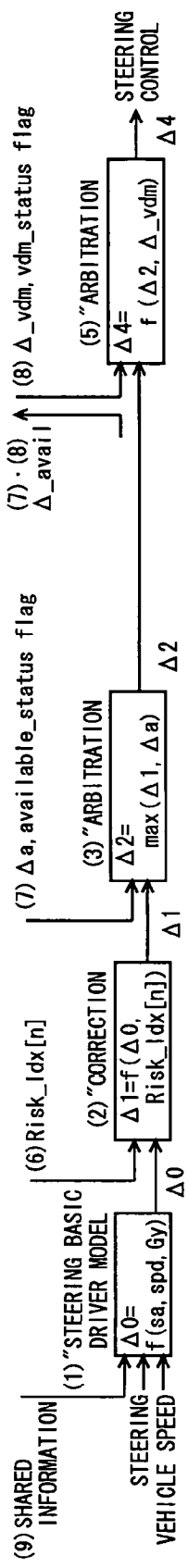
FIG. 6 is a diagram representing the input and output of signals in a main control system (3).

FIGS. 4-6 represent the control configuration of main control system (1), main control system (2) and main control system (3).

FIG. 4 shows a control configuration of main control system (1). Main control system (1) that covers control of the driving system is adapted by the procedures set forth below.

At driving basic driver model (1), the basic drive driver model output (Fxp0) is calculated based on HMI (Human Machine Interface) input information such as the accelerator pedal opening angle (pa), vehicle speed (spd) and gear ratio (ig) of the transmission that are shared information (9), and the like. The equation at this stage is represented by Fxp0=f (pa, spd, ig), using function f.

At correction functional unit (2), Fxp0 is corrected to output Fxp1 based on Risk_Idx [n] that is the environmental information (6) from the advisor unit (for example, information transformed into the concept of risk or the like). The equation at this stage is represented by Fxp1=f (Fxp0, Risk_Idx [n]), using function f.

Specifically, it is calculated by, for example, Fxp11=Fxp0× Risk_Idx [n]. The degree of risk is input from the advisor unit such as Risk_Idx [1]=0.8, Risk_Idx [2]=0.6, and Risk_Idx [3]=0.5.

Additionally, Fxp12 is calculated, which is a corrected version of Fxp0, based on information that is transformed into the concept of stability and the like from the vehicle state (10). The equation at this stage is represented by, for example, Fxp12=Fxp0×Stable_Idx [n]. The stability is input such as Stable_Idx [1]=0.8, Stable_Idx [2]=0.6, and Stable_Idx [3]=0.5.

A smaller value of these Fxp11 and Fxp12 may be selected to be output as Fxp1.

In this correction functional unit (2), assignment intention information can be output to automatic cruise functional unit (7) that is an agent function when the driver depresses the cruise control switch. In the case where the accelerator pedal is a reaction force controllable type here, the automatic cruise intention of the driver is identified based on the driver's manipulation with respect to the accelerator pedal to output assignment intention information to automatic cruise functional unit (7).

At arbitration functional unit (3), arbitration between Fxp1 output from correction functional unit (2) and Fxa output from automatic cruise functional unit (7) of the agent unit is executed to output Fxp2 to distribution unit (4). When accompanied with additional information (flag, available_status flag) indicative of output Fxa from automatic cruise functional unit (7) being valid, the arbitration function selects Fxa that is the output from automatic cruise functional unit (7) with highest priority to calculate Fxp2. In other cases, Fxp1 that is the output from correction functional unit (2) may be selected to calculate Fxp2, or Fxp1 output from correction function unit (2) may have Fxa reflected at a predetermined degree of reflection to calculate Fxp2. The equation at this stage is represented by Fxp2=max (Fxp1, Fxa), for example, using a function "max" that selects the larger value.

At distribution functional unit (4), distribution operation is mainly effected between main control system (1) that is the driving system control unit and main control system (2) that is the brake system control unit. Distribution functional unit (4) functions to output Fxp3 to arbitration functional unit (5) for the distribution towards the driving system that is the calculated result, and outputs FxB to main control system (2) for the distribution towards the brake system that is the calculated result. Further, drive availability Fxp_avail identified as the information of the driving power source that can be output from the power train which is the subject of control of main control system (1) is provided to automatic cruise functional unit (7) identified as the agent unit and dynamics compensation functional unit (8) identified as the supporter unit. The equation at this stage is represented by Fxp3←f (Fxa, Fxp2), FxB=f (Fxa, Fxp2), using function f.

At arbitration functional unit (5), arbitration is executed between Fxp3 output from distribution functional unit (4) and Fxp_vdm output from dynamics compensation functional unit (8) to output Fxp4 to the power train controller. When accompanied with additional information (flag, vdm_status flag) indicative of Fxp_vdm output from dynamics compensation functional unit (8) being valid, the arbitration function selects Fxp_vdm that is the output from dynamics compensation functional unit (8) with highest priority to calculate Fxp4. In other cases, Fxp3 that is the output from distribution functional unit (4) can be selected to calculate Fxp4, or Fxp3 output from distribution functional unit (4) may have Fxp_vdm reflected by a predetermined degree of reflection to calculate Fxp4. The equation at this stage is represented by, for example, Fxp4=f (Fxp3, Fxp_vdm).

FIG. 5 represents the control configuration of main control system (2). Main control system (2) covering the control of the brake system is adapted by the procedure set forth below.

At the brake basic driver model (1)', the basic braking driver model output (Fxp0) is calculated based on the HMI input information such as the brake pedal depression (ba), as well as vehicle speed (spd), that is the shared information (9), the horizontal G acting on the vehicle (Gy), and the like. The equation at this stage is represented by Fxb0=f (pa, spd, Gy), using function f.

At correction function unit (2)', Fxb0 is corrected to output Fxb1 based on Risk_Idx [n] that is the environmental information (6) from the advisor unit (for example, information transformed into the concept of risk and the like). The equation at this stage is represented by Fxb1=f (Fxb0, Risk_Idx [n]), using function f.

More specifically, it is calculated by, for example, Fxb11=Fxb0×Risk_Idx [n]. The degree of risk is input from the advisor unit such as Risk_Idx [1]=0.8, Risk_Idx [2]=0.6, and Risk_Idx [3]=0.5.

Further, Fxb12 that is a corrected version of Fxb0 is calculated, based on information transformed into the concept of stability and the like from the vehicle state (10). It is calculated by, for example, Fxb12=Fxb0×Stable_Idx [n]. For example, Stable_Idx [1]=0.8, Stable_Idx [2]=0.6, and Stable_Idx [3]=0.5 are input.

The larger of these Fxb11 and Fxb12 may be selected to be output as Fxb1. Specifically, the output may be corrected in accordance with the distance from the preceding running vehicle sensed by a millimeter wave radar, the distance to the next corner sensed by the navigation device, or the like.

At arbitration functional unit (3)', arbitration is executed between Fxb1 output from correction functional unit (2)' and Fxba output from automatic cruise functional unit (7) that is the agent unit to output Fxb2 to distribution unit (4)'. When accompanied with additional information (flag, available_status flag) indicative of Fxba output from automatic cruise functional unit (7) being valid, the arbitration function selects Fxba that is the output from automatic cruise functional unit (7) with highest priority to calculate Fxb2. In other cases, Fxb1 that is the output from correction functional unit (2)' may be selected to calculate Fxb2, or Fxb1 that is the output from correction functional unit (2)' may have Fxba reflected by a predetermined degree of reflection to calculate Fxb2. The equation at this stage is represented by, for example, Fxb2=max (Fxb1, Fxba), using a function "max" that selects the larger value.

At distribution functional unit (4)', distribution operation is conducted between main control system (1) that is the driving system control unit and main control system (2) that is the brake system control unit. Functional distribution unit (4)' corresponds to distribution functional unit (4) of main control system (1). Distribution functional unit (4)' outputs Fxb3 to arbitration functional unit (5)' for distribution towards the brake system that is the calculated result, and outputs FxP to main control system (1) for distribution towards the driving system that is the calculated result. Further, brake availability Fxb_avail identified as information that can be output from the brake that is the subject of control of main control system (2) is provided to automatic cruise functional unit (7) identified as the agent unit and dynamics compensation functional unit (8) identified as the supporter unit. The equation at this stage is represented by Fxb3 ←(Fxba, Fxb2), FxP=f (Fxba, Fxb2), using function f.

Arbitration functional unit (5)' executes arbitration between Fxb3 output from distribution functional unit (4)' and Fxb_vdm output from dynamics compensation functional unit (8) that is the support unit to output Fxb4 to the brake controller. When accompanied with additional information (flag, vdm_status flag) indicative of Fxb_vdm output from dynamics compensation functional unit (8) being valid, the arbitration function selects Fxb_vdm that is the output from dynamics compensation functional unit (8) with highest priority to calculate Fxb4. In other cases, Fxb3 that is the output from distribution functional unit (4)' may be selected to calculate Fxb4, or Fxb3 output from distribution functional unit (4)' may have Fxb_vdm reflected by a predetermined degree of reflection to calculate Fxb4. The equation at this stage is represented by, for example, Fxb4=max (Fxb3, Fxb_vdm), using a function "max" that selects the larger value.

FIG. 6 shows a control configuration of main control system (3). Main control system (3) covering control of the steering system is adapted to control by the procedure set forth below.

At steering basic driver model (1)", basic steering driver model output ($\Delta 0$) is calculated based on HMI input information such as the steering angle (sa), vehicle speed (spd) that is shared information (9), horizontal G acting on the vehicle (Gy), and the like. The equation at this stage is represented by $\Delta 0$=f (sa, spd, Gy), using function f.

At correction functional unit (2)", $\Delta 0$ is corrected to output $\Delta 1$ based on Risk_Idx [n] that is environmental information (6) from the adviser unit (for example, information transformed into the concept of risk, and the like). The equation at this stage is represented by $\Delta 1$ =f ($\Delta 0$, Risk_Idx [n]), using function f.

Specifically, it is calculated by $\Delta 11$ =$\Delta 0 \times$Risk_Idx [n]. The degree of risk is input from the adviser unit such as Risk_Idx [n]=0.8, Risk_Idx [2] =0.6, and Risk_Idx [3]=0.5.

Further, $\Delta 12$ that is a corrected version of $\Delta 0$ is calculated based on information transformed into the concept of stability and the like from the vehicle state (10). The equation at this stage is represented by $\Delta 12$ =$\Delta 0 \times$Stable_Idx [n]. For example, Stable_Idx [1]=0.8, Stable_Idx [2]=0.6, and Stable_Idx [3]=0.5 are input.

The smaller of these $\Delta 11$ and $\Delta 12$ may be selected to be output as $\Delta 1$.

At correction functional unit (2)", assignment intention information to automatic cruise functional unit (7) that is the agent function can be output when the driver has depressed the lane keep assist switch. Furthermore, the output may be corrected in accordance with an external disturbance such as the side wind at correction functional unit (2)".

At arbitration functional unit (3)", arbitration is executed between $\Delta 1$ output from correction functional unit (2)" and $\Delta a$ output from automatic cruise functional unit (7) that is the agent unit to output $\Delta 2$ to arbitration unit (5)". When accompanied with additional information (flag, available_status flag) indicative of $\Delta a$ that is the output from automatic cruise functional unit (7) being valid, the arbitration function selects $\Delta a$ that is the output from automatic cruise functional unit (7) with the highest priority to calculate $\Delta 2$. In other cases, $\Delta 1$ that is the output from correction functional unit (2)" may be selected to calculate $\Delta 2$, or $\Delta 1$ that is the output from correction functional unit (2)" may have $\Delta a$ reflected by a predetermined degree of reflection to calculate $\Delta 2$. The equation at this stage is represented by, for example, $\Delta 2$=f ($\Delta 1$, $\Delta a$).

At arbitration functional unit (5)", arbitration is executed between $\Delta 2$ output from arbitration functional unit (3)" and $\Delta\_vdm$ output from dynamics compensation function unit (8) that is the supporter unit to provide $\Delta 4$ to the steering controller. When accompanied with additional information (flag, vdm_status flag) indicative of $\Delta\_vdm$ output from dynamics compensation functional unit (8) being valid, the arbitration function selects $\Delta\_vdm$ that is the output from dynamics compensation functional unit (8) with highest priority to calculate $\Delta 4$. In other cases, $\Delta 2$ may be selected that is the output from arbitration functional unit (3)" to calculate $\Delta 4$, or $\Delta 2$ that is the output from arbitration functional unit (3)" may have $\Delta\_vdm$ reflected by a predetermined degree of reflection to calculate $\Delta 4$. The equation at this stage is represented by, for example, $\Delta 4$=max ($\Delta 2$, $\Delta\_vdm$), using a function "max" that selects the larger value.

The operation of a vehicle incorporating the integrated control system set forth above will be described hereinafter.

During driving, the driver manipulates accelerator pedal 200, brake pedal 580 and steering wheel 440 to control the driving system control unit corresponding to the "running" operation that is the basic operation of a vehicle, the brake system control unit corresponding to the "stop" operation, and the steering system control unit corresponding to a "turning" operation, based on information obtained by the driver through his/her own sensory organs (mainly through sight). Basically, the driver controls the vehicle through HIM input therefrom. There may also be the case where the driver manipulates the shift lever of the automatic transmission to modify the gear ratio of transmission 240 in an auxiliary manner.

During the drive of a vehicle, various environmental information around the vehicle is sensed by various devices incorporated in the vehicle, in addition to the information obtained by the driver through his/her own sensory organs. The information includes, by way of example, the distance from the vehicle running ahead, sensed by a millimeter wave radar, the current vehicle position and the road state ahead (corner, traffic jam, and the like) sensed by the navigation device, the road inclination state sensed by a G sensor (level road, up-climbing road, down-climbing road), the outdoor temperature of vehicle sensed by an outdoor temperature sensor, local weather information of the current running site received from a navigation device equipped with a receiver, the road resistance coefficient (low μ road state and the like by road surface freezing state), the running state of the vehicle ahead sensed by a blind corner sensor, a lane-keep state sensed based upon an image-processed picture taken by an outdoor camera, the driving state of the driver sensed based upon an image-processed picture taken by an indoor camera (driver posture, wakeful state, nod-off state), the dosing state of a driver sensed by sensing and analyzing the grip of the driver's hand by a pressure sensor provided at the steering wheel, and the like. These information are divided into environmental information around the vehicle, and information about the driver himself/herself It is to be noted that both information are not sensed through the sensory organs of the driver.

Furthermore, the vehicle dynamic state is sensed by a sensor provided at the vehicle. The information includes, by way of example, wheel speed Vw, vehicle speed in the longitudinal direction Vx, longitudinal acceleration Gx, lateral acceleration Gy, yaw rate γ, and the like.

The present vehicle incorporates a cruise control system and a lane-keep assist system as the driving support system to support the driver's drive. These systems are under control of the agent unit. It is expected that a further development of the agent unit will lead to implementation of a complete automatic cruising operation, exceeding the pseudo automatic cruising. The integrated control system of the present embodiment is applicable to such cases. Particularly, implementation of such an automatic cruising system is allowed by just modifying the automatic cruise function of the agent unit to an automatic cruise function of a higher level without modifying the driving system control unit corresponding to main control system (1), the brake system control unit corresponding to main control system (2), the steering system control unit corresponding to main control system (3), the adviser unit, and the supporter unit.

Consider a case where there is a corner ahead in the currently-running road during driving. This corner cannot be identified by the eye sight of the driver, and the driver is not aware of such a corner. The adviser unit of the vehicle senses the presence of such a corner based on information from a navigation device.

When the driver steps on accelerator pedal 200 for acceleration in the case set forth above, the driver will depress brake pedal 580 subsequently to reduce the speed of the vehicle at the corner. At main control system (1), the basic drive driver model output Fxp0 is calculated by Fxp0=f (pa, spd, ig), based on the accelerator pedal opening angle (pa), vehicle speed (spd), gear ratio of the transmission (ig), and the like. Conventionally, a large request driving torque value will be calculated based on this FxP0 to cause opening of the throttle valve of engine 140, and/or reducing the gear ratio of transmission 240 to cause vehicle acceleration. In the present invention, the adviser unit calculates the degree of risk Risk_Idx [n] based on the presence of the corner ahead and outputs this information to correction functional unit (2). Correction functional unit (2) performs correction such that acceleration is not exhibited as the driver will expect from his/her depression on accelerator pedal 200.

When the supporter unit senses that the road surface is freezing and there is a possibility of slipping sideways by the vehicle longitudinal acceleration at this stage, Stable_Idx [n] that is the degree of risk related to stability is calculated and output to correction functional unit (2). Thus, correction functional unit (2) performs correction such that acceleration is not exhibited as the driver will expect from his/her depression on accelerator pedal 200.

When slippage of the vehicle is sensed, the supporter unit outputs to arbitration functional unit (5) a signal that will reduce the driving torque. In this case, Fxp_vdm from the supporter unit is employed with priority such that the power train is controlled to suppress further slippage of the vehicle. Therefore, even if the driver steps on accelerator pedal 200 greatly, arbitration is established such that the acceleration is not exhibited as the driver will expect from his/her depression on accelerator pedal 200.

An external disturbance compensation function in such a vehicle integrated control system will specifically be described.

Figure 7:
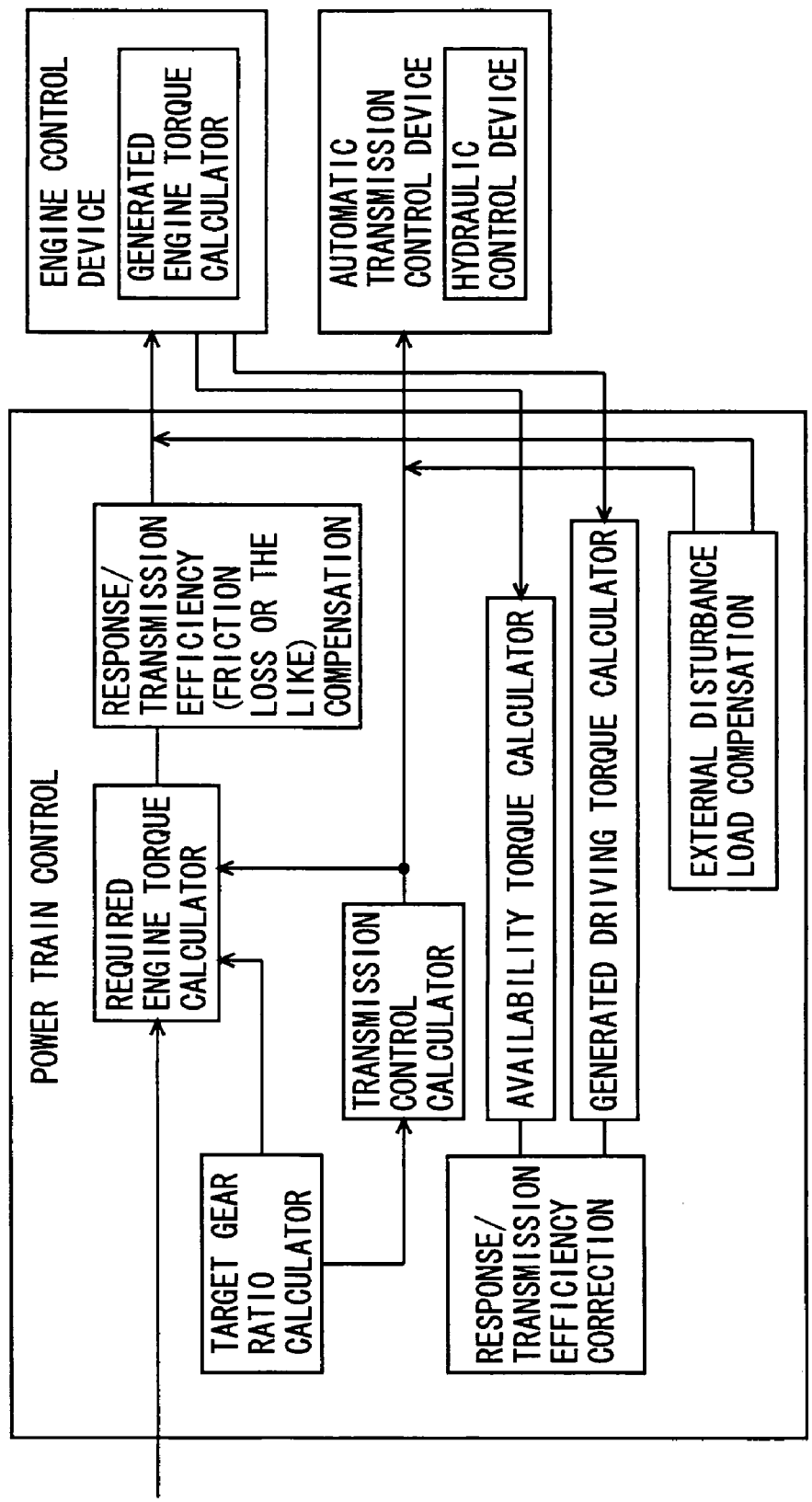
FIG. 7 is a schematic diagram of a configuration of a power train controller executing external disturbance compensation control.

As shown in FIG. 7, an external disturbance load compensator is provided to the power train controller in the vehicle integrated control system. The external disturbance load compensator is not necessary provided inside the power train, and it may be provided in any of the constituent elements shown in the schematic diagram of the configuration of the vehicle integrated control system of FIG. 2, or it may be provided independently of the constituent elements.

The external disturbance load refers to an air conditioner compressor, an oil pump, an alternator, a power steering or the like that is connected to engine 140 that is a motive power source (a driving power source of the vehicle), and that can be a load for engine 140 even with a temporary operation.

As shown in FIG. 7, from external disturbance load compensator, a control signal is transmitted to an engine control device and an automatic transmission control device. This control signal is for preventing an increase in the revolution of engine 140 from affecting the driving system, when there is a change (an increase) in the load of an engine auxiliary machine.

The signals being input/output between the external disturbance load compensator and an ECU (Electronic Control Unit) controlling the engine auxiliary machine may include 1) an external disturbance load (torque) amount, 2) a necessary response allowance time from the external disturbance load side, 3) an allowance torque quantity that can be calculated from a required driving torque, 4) a changing rate of the allowance torque that can be calculated from a required driving torque, 5) a response possible signal, and 6) a response refusal signal. The signal values are basically calculated at the external disturbance load compensator.

Further, environmental information that is information on surroundings of the vehicle is input to the external disturbance load compensator. For example, from a navigation device, an on-board camera shooting pictures of the surroundings of the vehicle, a millimeter wave radar sensing an obstacle ahead of the vehicle and the like, the current state of the vehicle is input as the environmental information, and by processing this environmental information, the behavior of the vehicle (acceleration, driving force, deceleration, braking force) is expected. The engine control device and the automatic transmission control device (and hence the brake control device) are controlled such that the vehicle behavior is automatically realized, whereby the driver's burden of manipulation (for example, burden of manipulating brake pedal, frequent alternating manipulation of accelerator pedal and brake pedal, and the like) is reduced.

Figure 8:
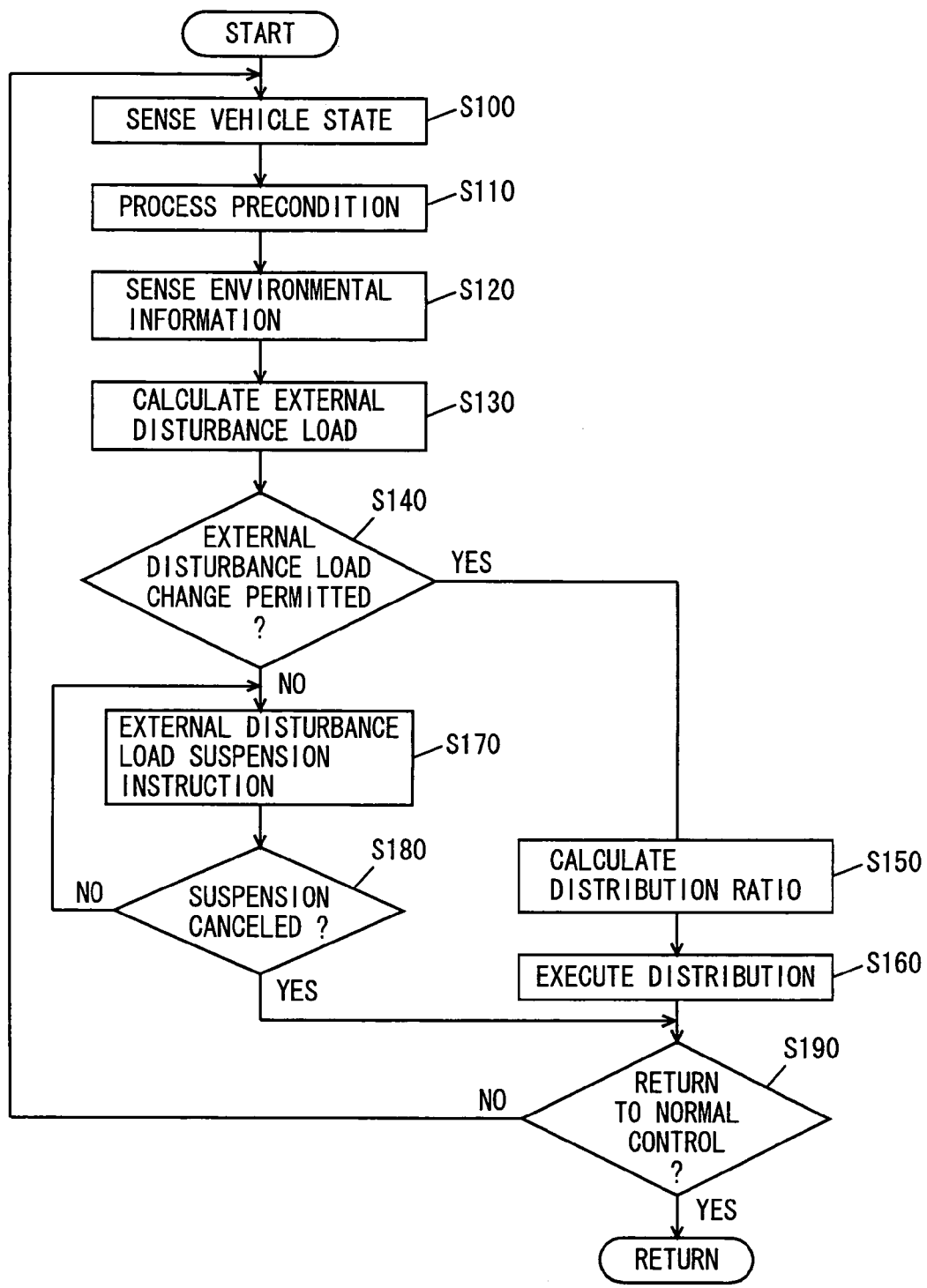
FIG. 8 is a flowchart showing a control configuration of a program executed at an ECU realizing an external disturbance load compensator.

Further, using the flowchart of FIG. 8, the control configuration of a program executed at the ECU realizing an external disturbance load compensator will be described. It should be noted that, likewise in the foregoing description, the external disturbance load compensator may be realized by one ECU or it may be incorporated by an ECU having other function.

At step (hereinafter step is referred to as S) 100, the external disturbance load compensator ECU senses a vehicle state. Here, the speed of the vehicle, the revolution of engine 140, the required engine torque and the like are sensed. At S110, external disturbance load compensator ECU executes a process of a precondition. Here, the external disturbance load compensator ECU processes HNI (Human Machine Interface) input information such as an accelerator pedal signal from the driver or a brake pedal signal from the driver. Such information may be input from main control system (1) or main control system (2).

At S120, the external disturbance load compensator ECU senses environmental information. Here, it senses information on the current position (for example, an intersection) or information on the direction ahead of the vehicle (whether or not there is a traffic jam) from a navigation device. It should be noted that, the traffic jam information ahead of the vehicle may be information from a VICS (Vehicle Information Communication System) incorporated in the car navigation device, or it may be information from an on-board camera or a millimeter wave radar.

At S130, the external disturbance load compensator ECU calculates an external disturbance load. Here, the external disturbance load compensator ECU calculates a load (a thermal load, an electric load). For example, it calculates a load of an air conditioner compressor when an air conditioner (for cooling) is operated.

At S140, the external disturbance load compensator ECU determines whether or not to permit an external disturbance load change. Here, the external disturbance load compensator ECU does not permit the external disturbance load change if, for example, the current vehicle state indicates that the vehicle is stopping at the red light of a traffic signal at an intersection and there is no traffic jam ahead of the vehicle, based on the vehicle state sensing process at S100 and the environmental information sensing process at S120 (no permission). In other words, when it can be expected that the vehicle will start to move, i.e., the vehicle will transit to a driving state from the state of the current time point, the external disturbance load compensator ECU permits a load change after the vehicle enters the driving state. When it is expected that a driving state will be entered (in other words, the green light of the signal will be on and the driver will depress the accelerator pedal to move the vehicle), the increase in the driving torque of engine 140 covers the change of the engine auxiliary machine. In such a case, since the driver does not recognize the change in the driving force as a whole, the load change of the external disturbance load is suspended until the vehicle starts to move. On the other hand, when it cannot be expected that the vehicle will start to move, i.e., the vehicle will transit to a driving state from the state of the current time point, the external disturbance load compensator ECU permits a load change at that time point (permission). Since the external disturbance load compensator ECU cannot expect that the increase in the load of the engine auxiliary machine can be covered by the increase in the torque of engine 140 associated with starting of the vehicle, it immediately permits the load change and controls the vehicle (the power train of the driving system, the brake of the brake system) so as to suppress the increase in the torque of engine 140 produced by the load change (hereinafter, the concept of "to suppress" includes "to cancel" an increase in the torque of engine 140 produced by the load change). When the external disturbance load compensator ECU determines that the external disturbance load change is permitted (YES at S140), the process goes to S150. Otherwise (NO at S140), the process goes to S170.

At S150, the external disturbance load compensator ECU performs a distribution ratio calculation. Here, the power train (engine 140 and transmission 240) and brake 560 are controlled through main control system (1) (accelerator pedal) and main control system (2) (brake pedal), so that engine 140 generates a required driving force and the behavior of the vehicle satisfies the request of the driver, based on the state of the vehicle sensed at S100 and the external disturbance load calculated at S130.

The distribution ratio calculation will specifically be described. At S140, when the external disturbance load change is permitted, engine 140 is controlled so that the engine torque increases (and consequently, the engine revolution increases) by an amount corresponding to the generation of the external disturbance load. In this case, the driving torque output from transmission 240 associated with torque converter 220 is proportional to a square of input revolution to torque converter 220 (i.e., the revolution of engine 140). Accordingly, when the driver does not request an increase in the driving torque (for example, when the accelerator pedal is not depressed, when not driving an up-climbing road), an increase in the revolution of engine 140 should be suppressed as much as possible. On the other hand, in the load (the engine auxiliary machine) side, it is necessary to increase the torque of engine 140 in response to the request of the load side. Since the operation involves requirements running counter to each other, while the torque of engine 140 is increased for the engine auxiliary machine, this increase in torque (the increase proportional to the square of the revolution of engine 140) is set so as not to affect the driving system. To this end, control described in the following is executed. It should be noted that other control is also possible.

1) Synchronizing the time, a braking force corresponding to an increase in the torque is generated at brake 560. In this case, a control signal for brake operation is output from the power train system to the brake system. In other words, although torque is transmitted to wheels 100, it is cancelled by the operation the brake.

2) Slip or release a starting clutch. In other words, torque is not transmitted to wheels 100.

3) Calculate an increase in the engine revolution, and set the gear ratio of transmission 240 to the high-speed side in advance so that the torque transmitted to wheels 100 is reduced. In other words, although torque is transmitted to wheels 100, the torque is set to be small.

As described above, engine 140 is controlled in an integral manner relative to transmission 240 and brake 560, and the driving force and the braking force are controlled to be distributed so that a change in the torque of engine 140 due to external disturbance load is not transmitted, or not transmitted by a great amount, to wheels 100.

At S160, the external disturbance load compensator ECU executes distribution control based on the result calculated at S150. Thereafter, the process goes to S190.

At S170, the external disturbance load compensator ECU outputs a signal indicative of an instruction of suspending the external disturbance load. This signal is transmitted to an ECU controlling an engine auxiliary machine that is an external disturbance load, and causes to stop the operation of the compressor of an air conditioner even when the operation switch of the air conditioner (for cooling) is turned on.

At S180, the external disturbance load compensator ECU determines whether or not suspension of the external disturbance load is canceled. At this time, the external disturbance load compensator ECU determines that suspension of the external disturbance load is canceled when, for example, the driver of the vehicle depresses the accelerator pedal. When it is determined that the suspension of the external disturbance load is canceled (YES at S180), then the process goes to S190. Otherwise (NO at S180), the process goes back to S170 and the suspended state is continued.

At S190, the external disturbance load compensator ECU determines whether or not to return to normal control. When it determines to return to the normal control (YES at S190), the process ends. Otherwise (No at S190), the process goes back to An operation of the vehicle incorporating the vehicle integrated control system of the present embodiment based on the configuration and the flowcharts above will be described.

[Turn on an Air Conditioner While Stopping at the Red Light at an Intersection Not in a Traffic Jam]

The vehicle state is sensed (S100), and the facts that the vehicle speed is zero, that the engine revolution is an idle revolution (the idle revolution when an air conditioner is off) and the like are sensed. The facts that the driver is not depressing the accelerator pedal, that the cooling operation of the air conditioner is turned on and the like are sensed (S110). The environmental information of the vehicle is sensed (S120), and the facts that the vehicle is stopping at an intersection and that there is no traffic jam ahead are sensed. In other words, it is expected that the green light of the traffic signal will be on and the driver will depress the accelerator pedal to move the vehicle in the near future.

In such a case, the external disturbance change is not permitted (NO at S140), and the compressor does not operate even when the cooling switch of the air conditioner is turned on, and an external disturbance load suspend instruction state is entered, where cool air is not blown into the vehicle interior (S170).

When the traffic signal changes from the red light to the green light and the driver depresses the accelerator pedal to move the vehicle, the suspension state of the external disturbance load change is canceled (YES at S180). Here, engine 140 increases its revolution from the idle revolution to a desired revolution in order to generate great starting torque for starting to move the vehicle. Even when the engine auxiliary machine (the air conditioner compressor) that is the external disturbance load is operated at time points subsequent to this timing, the driver does not recognize the torque change as a whole.

[Turn on an Air Conditioner While Stopping at the Red Light at an Intersection in a Traffic Jam]

The vehicle state is sensed (S100), and the facts that the vehicle speed is zero, that the engine revolution is an idle revolution (the idle revolution when an air conditioner is off) and the like are sensed. The facts that the driver is not depressing the accelerator pedal, that the cooling operation of the air conditioner is turned on and the like are sensed (S110). The environmental information of the vehicle is sensed (S120), and the facts that the vehicle is stopping at an intersection and that there is a traffic jam ahead are sensed. In other words, it is expected that the driver will not depress the accelerator pedal to move the vehicle in the near future, even when the green light of the traffic signal turns on.

In such a case, the external disturbance change is permitted (YES at S140), and the compressor will operate when the cooling switch of the air conditioner is turned on, and cool air is blown into the vehicle interior.

Here, the revolution of engine 140 increases by an amount calculated at S130. Here, since the vehicle is in the stopped state, an increase in creep force associated with the increase in the revolution of engine 140 may cause the vehicle to move forward even at the red light of the traffic signal if the driver does not depress the brake pedal rather forcefully, if no control is executed. Therefore, in such a case, 1) a braking force corresponding to an increase in torque is produced at brake 560, or 2) the starting clutch of the transmission is slipped, whereby the increase in the torque of engine 140 is transmitted to wheels 100 but canceled by operation of brake 560, or the torque is not transmitted to wheels 100. Thus, the vehicle can maintain the stopped state even when the driver does not operate the brake.

It should be noted that the aforementioned compressor of the air conditioner may rotatably driven as connected to a crank shaft pulley of engine 140 through a belt, or it may be a motor driven compressor. The external disturbance load when driven by a belt can be grasped as the torque of engine 140. When it is a motor driven compressor, it can be grasped as an electric load. This applies as well to engine auxiliary machines other than an air conditioner. Additionally, when the vehicle incorporates not only an engine but also a motor for driving the vehicle, coordination control of the engine and motor should be executed to attain the optimum energy consumption.

Thus, the vehicle integrated control system of the present embodiment operates as follows: at main control system (1) identified as the driving system control unit, accelerator pedal manipulation that is a request of a driver is sensed, and a control target of the driving system corresponding to the accelerator pedal manipulation is generated using a driving basic driver model, whereby the power train that is a drive actuator is controlled. At main control system (2) identified as the brake system control unit, brake pedal manipulation that is a request of the driver is sensed, and a control target of the brake system corresponding to the brake pedal manipulation is generated using a brake basic driver model, whereby the brake device that is the braking actuator is controlled. At main control system (3) identified as the steering system control unit, steering manipulation that is a request of the driver is sensed, and a control target of the steering system corresponding to the steering manipulation is generated using a steering basic driver model, whereby the steering device that is an actuator is controlled. These control units operate autonomously.

In addition to the driving system control unit, brake system control unit, and steering system control unit operating autonomously, there are further provided an adviser unit, an agent unit, and a supporter unit. The adviser unit generates and provides to respective control units information to be used at respective control units based on environmental information around the vehicle or information related to the driver. The adviser unit processes information representing the degree of risk with respect to operation characteristics of the vehicle based on the frictional resistance of the running road, outer temperature and the like as environmental information around the vehicle, and/or information representing the degree of risk with respect to the manipulation by a driver based on the fatigue level of the driver upon shooting a picture of the driver so as to be shared among respective control units. The agent unit generates and provides to respective control units information to be used at respective control units to cause the vehicle to implement a predetermined behavior. The agent unit generates information to implement an automatic cruise functions for automatic cruising of vehicle. Information to implement the automatic cruise function is output to respective control units. The supporter unit generates and provides to respective control units information to be used at respective control unit based on the current dynamic state of the vehicle. The supporter unit identifies the current dynamic state of the vehicle to generate information required to modify the target value at respective control units.

At respective control units, arbitration processing is conducted as to whether information output from the adviser unit, agent unit and supporter unit is to be reflected in the motion control of the vehicle, and if to be reflected, the degree of reflection thereof These control unit, adviser unit, agent unit and supporter unit operate autonomously. Eventually at respective control units, the power train, brake device, and steering device are controlled based on the eventual drive target, braking target, and steering target calculated by information input from the adviser unit, agent unit and supporter unit, as well as information communicated among respective control units.

Thus, the driving system control unit corresponding to a "running" operation that is the basic operation of the vehicle, the brake system control unit corresponding to a "stop" operation, and the steering system control unit corresponding to a "turning" operation are provided operable in a manner independent of each other. With respect to these control units, the adviser unit, agent unit and supporter unit are provided, that can generate and output to respective control units information related to the risk and stability with respect to environmental information around the vehicle and information related to the driver, information to implement automatic cruise function for automatic cruising of the vehicle, and information required to modify the target value of respective control units to these control units. Therefore, a vehicle integrated control system that can readily accommodate automatic cruising control of high level can be provided.

Specifically, when an increase in the load by an engine auxiliary machine occurs when the vehicle is stopping at an intersection without a traffic jam, since it is expected that the driver will depress the accelerator pedal to move the vehicle in the near future, a load change is set in a suspended state. In other words, as the increase in the load by the engine auxiliary machine will be covered by an increase in the torque of the engine associated with starting of the vehicle in the near future, the load change is not permitted until the vehicle is moved. On the other hand, when it is not expected that the driver will depress the accelerator pedal to move the vehicle in the near future, a load change is permitted and the transmission, the brake and the like are controlled in an integrated manner so as to cancel the engine torque that increases along with the load change. Thus, the need for a redundant manipulation by a driver can be eliminated. The external disturbance load compensator executing such control may be provided at any of the adviser unit, the agent unit and the supporter unit.

In the case where the flag from the adviser unit, agent unit and supporter unit is reset with the manipulation of the driver given highest priority, control using a signal from this driving support unit will not be conducted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicle integrated control system, comprising:
   a driving system control unit controlling a driving system of a vehicle based on a manipulation request related to driving of said vehicle;
   a brake system control unit controlling a brake system of said vehicle based on a manipulation request related to braking of said vehicle; and
   a driving force change suppression unit that includes a sensor that senses a load change in a load device connected to a motive power source of the vehicle and the driving force change suppression unit controls in an integrated manner the driving system control unit and the brake system control unit so as to suppress an effect of the load change by controlling in a distributed manner a driving force and a braking force.

2. A vehicle integrated control system, comprising:
   a driving system control unit controlling a driving system of a vehicle based on a manipulation request related to driving of said vehicle;
   a brake system control unit controlling a brake system of said vehicle based on a manipulation request related to braking of said vehicle; and
   a driving force change suppression unit controlling said vehicle so as to suppress a change in a driving force of a driving power source due to a load change in a load device having said driving power source for allowing said vehicle to run as a motive power source thereof, wherein
   said driving force change suppression unit includes
   a sensor sensing environmental information on surroundings of said vehicle,
   a controller controlling in an integrated manner a driving force of said driving system control unit and a braking force of said brake system control unit so as to suppress said change in the driving force, and
   a determiner determining whether or not control by said controller is to be executed based on said environmental information.

3. The vehicle integrated control system according to claim 2, wherein
   said determiner determines that the control by said controller is not to be executed when a state of said vehicle changes based on said sensed environmental information.

4. The vehicle integrated control system according to claim 3, wherein
   said driving force change suppression unit maintains said load unchanged until the state of said vehicle changes.

5. The vehicle integrated control system according to claim 2, wherein
   said determiner determines that the control by said controller is not to be executed when the state of said vehicle changes from a stopped state to a running state based on said sensed environmental information.

6. The vehicle integrated control system according to claim 5, wherein
   said driving force change suppression unit maintains said load unchanged until the state of said vehicle changes from a stopped state to a running state.

7. The vehicle integrated control system according to claim 2, wherein
   said determiner determines that the control by said controller is to be executed when a state of said vehicle does not change based on said sensed environmental information.

8. The vehicle integrated control system according to claim 7, wherein
   said controller controls at least one of said driving system control unit and said brake system control unit so as to suppress said change in the driving force.

9. The vehicle integrated control system according to claim 8, wherein
   said controller executes control so as to change a required braking force of said brake system control unit based on a driving force of said driving system control unit in order to suppress said change in the driving force.

10. The vehicle integrated control system according to claim 9, wherein
said controller executes control so as to increase said required braking force of said brake system control unit.

11. The vehicle integrated control system according to claim 1, wherein
said load device is one of a power steering device, a compressor device of an air conditioner and an alternator device.

12. A vehicle integrated control system, comprising:
a driving system control unit controlling a driving system of a vehicle based on a manipulation request related to driving of said vehicle;
a brake system control unit controlling a brake system of said vehicle based on a manipulation request related to braking of said vehicle; and
a driving force change suppression unit controlling said vehicle to suppress a change in a driving force of a driving power source due to a load change in a load device having said driving power source for allowing said vehicle to run as a motive power source thereof, wherein
said driving force change suppression unit includes
sensing means for sensing environmental information on surroundings of said vehicle,
controlling means for controlling in an integrated manner a driving force of said driving system control unit and a braking force of said brake system control unit so as to suppress said change in the driving force, and
determination means for determining whether or not control by said controlling means is to be executed based on said environmental information.

13. The vehicle integrated control system according to claim 12, wherein
said determination means includes means for determining that the control by said controlling means is not to be executed when a state of said vehicle changes based on said sensed environmental information.

14. The vehicle integrated control system according to claim 13, wherein
said driving force change suppression unit further includes means for maintaining said load unchanged until the state of said vehicle changes.

15. The vehicle integrated control system according to claim 12, wherein
said determining means includes means for determining that the control by said controlling means is not to be executed when the state of said vehicle changes from a stopped state to a running state based on said sensed environmental information.

16. The vehicle integrated control system according to claim 15, wherein
said driving force change suppression unit further includes means for maintaining said load unchanged until the state of said vehicle changes from a stopped state to a running state.

17. The vehicle integrated control system according to claim 12, wherein
said determination means includes means for determining that the control by said controlling means is to be executed when a state of said vehicle does not change based on said sensed environmental information.

18. The vehicle integrated control system according to claim 17, wherein
said controlling means further includes means for controlling at least one of said driving system control unit and said brake system control unit so as to suppress said change in the driving force.

19. The vehicle integrated control system according to claim 18, wherein
said controlling means includes means for executing control so as to change a required braking force of said brake system control unit based on a driving force of said driving system control unit in order to suppress said change in the driving force.

20. The vehicle integrated control system according to claim 19, wherein
said controlling means includes means for executing control so as to increase said required braking force of said brake system control unit.

21. The vehicle integrated control system according to claim 12, wherein
said load device is one of a power steering device, a compressor device of an air conditioner and an alternator device.

* * * * *